United States Patent
Nagashima et al.

(10) Patent No.: US 10,145,735 B2
(45) Date of Patent: Dec. 4, 2018

(54) ELECTROMAGNETIC WAVE MEASURING DEVICE, ELECTROMAGNETIC WAVE MEASURING METHOD, AND PROGRAMS THEREFOR

(71) Applicant: TOPCON CORPORATION, Itabashi-ku (JP)

(72) Inventors: Hiroki Nagashima, Itabashi-ku (JP); Atsushi Shoji, Itabashi-ku (JP); Akira Oide, Itabashi-ku (JP)

(73) Assignee: TOPCON CORPORATION, Itabashi-ku (JP)

( * ) Notice: Subject to any disclaimer, the term of this patent is extended or adjusted under 35 U.S.C. 154(b) by 0 days.

(21) Appl. No.: 15/283,868

(22) Filed: Oct. 3, 2016

(65) Prior Publication Data

US 2017/0097262 A1    Apr. 6, 2017

(30) Foreign Application Priority Data

Oct. 6, 2015  (JP) .................................. 2015-198486

(51) Int. Cl.
*G01J 1/44*    (2006.01)
*G01B 11/00*   (2006.01)

(52) U.S. Cl.
CPC ................ *G01J 1/44* (2013.01); *G01B 11/00* (2013.01)

(58) Field of Classification Search
CPC .................................. G01J 1/44; G01B 11/00
USPC ....................................................... 356/614
See application file for complete search history.

(56) References Cited

U.S. PATENT DOCUMENTS

| | | | | |
|---|---|---|---|---|
| 4,674,875 A | * | 6/1987 | Koizumi | G01N 21/9506 250/559.42 |
| 2010/0241394 A1 | * | 9/2010 | Ihara | G01B 21/24 702/151 |
| 2012/0050586 A1 | * | 3/2012 | Kanemitsu | H04N 5/357 348/246 |
| 2012/0133918 A1 | * | 5/2012 | Sakimura | G01C 15/002 356/4.01 |
| 2012/0310100 A1 | * | 12/2012 | Galen | A61B 5/726 600/500 |
| 2014/0267672 A1 | * | 9/2014 | Morrison | H04N 5/332 348/79 |
| 2015/0073750 A1 | * | 3/2015 | Birru | H05B 37/0254 702/183 |
| 2016/0355873 A1 | * | 12/2016 | Dzakula | C12Q 1/6809 |

FOREIGN PATENT DOCUMENTS

JP         8-15093       1/1996

* cited by examiner

*Primary Examiner* — Hina F Ayub
(74) *Attorney, Agent, or Firm* — Xsensus, LLP (57) ABSTRACT

A technique for effectively detecting abnormal values in electromagnetic wave measurement is provided. An electromagnetic wave measuring device includes a measurement data receiving unit 308, an abnormal value detecting unit 309, and a GUI controlling unit 306. The measurement data receiving unit 308 receives measurement data of electromagnetic waves that are measured at multiple positions. The abnormal value detecting unit 309 detects an abnormal value in the measurement data. The GUI controlling unit 306 displays a position at which the abnormal value is measured, on a display.

9 Claims, 10 Drawing Sheets

| No. | Date and time of measurement | Illuminance (lx) |
|---|---|---|
| A11 | 10/12 14:08 | 120.3 |
| A12 | 10/12 14:11 | 119.4 |
| A13 | 10/12 14:13 | 109.7 |
| A14 | 10/12 14:16 | 111.5 |
| A15 | 10/12 14:18 | 117.3 |
| A16 | 10/12 14:21 | 123.2 |
| A17 | 10/12 14:24 | 118.7 |

| Maximum value | 123.2 |
|---|---|
| Minimum value | 109.7 |
| Average value | 117.1 |

Fig. 9

| No. | Date and time of measurement | Illuminance (lx) |
|---|---|---|
| A11 | 10/12 14:08 | 120.3 |
| A12 | 10/12 14:11 | 119.4 |
| A13 | 10/12 14:13 | 109.7 |
| A14 | 10/12 14:16 | 111.5 |
| A15 | 10/12 14:18 | 117.3 |
| A16 | 10/12 14:21 | 123.2 |
| A17 | 10/12 14:24 | 118.7 |

| Maximum value | 123.2 |
|---|---|
| Minimum value | 109.7 |
| Average value | 117.1 |

ELECTROMAGNETIC WAVE MEASURING DEVICE, ELECTROMAGNETIC WAVE MEASURING METHOD, AND PROGRAMS THEREFOR

BACKGROUND OF THE INVENTION

Technical Field

The present invention relates to a technique for measuring electromagnetic waves.

Background Art

Techniques for testing the performance of lighting equipment or lighting facilities are publicly known. Such a technique is disclosed in Japanese Unexamined Patent Application Laid-Open No. 8-015093, for example.

The testing of the performance of a lighting facility should be performed at multiple points. In some cases, the measurement cannot be performed correctly for reasons such as a measuring device is hidden by an operator, a measuring device faces an inappropriate direction, etc. Consequently, abnormal values may be obtained.

SUMMARY OF THE INVENTION

In view of these circumstances, an object of the present invention is to provide a technique for effectively detecting abnormal values in electromagnetic wave measurement.

A first aspect of the present invention provides an electromagnetic wave measuring device including a measurement data receiving unit, an abnormal value detecting unit, and a display controlling unit. The measurement data receiving unit is configured to receive measurement data of electromagnetic waves that are measured at multiple positions. The abnormal value detecting unit is configured to detect an abnormal value in the measurement data. The display controlling unit is configured to display a position at which the abnormal value is measured, on a display.

According to a second aspect of the present invention, in the invention according to the first aspect of the present invention, the display controlling unit may control displaying of a screen showing relative positional relationships between measurement planned positions in a measurement field and may control highlighting of the position, at which the abnormal value is measured, in the displayed screen. The measurement planned positions are candidates at each of which the electromagnetic wave is measured.

According to a third aspect of the present invention, in the invention according to the first or the second aspect of the present invention, a position at which the electromagnetic wave is measured may be measured by a position measuring device. In this case, the position measuring device may be operated by an output signal when the position, at which the abnormal value is measured, is selected.

According to a fourth aspect of the present invention, in the invention according to the third aspect of the present invention, the display controlling unit may display a relative positional relationship between one of the measurement planned positions and a position of a target that is measured by the position measuring device, on the display.

A fifth aspect of the present invention provides an electromagnetic wave measuring method including measuring electromagnetic waves at multiple positions, receiving the measurement data of the electromagnetic waves, detecting an abnormal value in the measurement data, and displaying a position at which the abnormal value is measured, on a display.

A sixth aspect of the present invention provides a computer program product including a non-transitory computer-readable medium storing computer-executable program codes for electromagnetic wave measurement. The computer-executable program codes include program code instructions for measuring electromagnetic waves at multiple positions, receiving the measurement data of the electromagnetic waves, detecting an abnormal value in the measurement data, and displaying a position at which the abnormal value is measured, on a display.

According to the present invention, a technique for effectively detecting abnormal values in electromagnetic wave measurement is obtained.

PREFERRED EMBODIMENTS OF THE INVENTION

Outline

Figure 1:
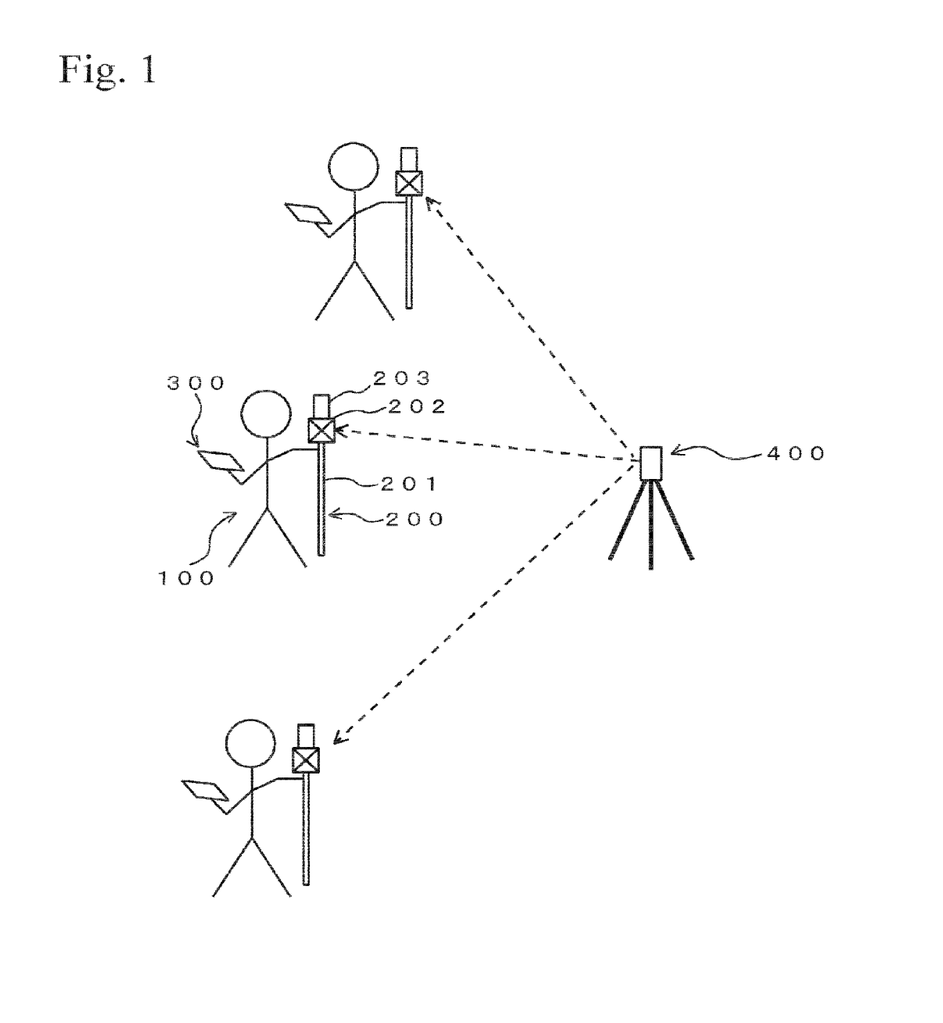
FIG. 1 is a conceptual diagram showing an outline of work for measuring illuminance.

FIG. 1 shows an outline of work for measuring illuminance in an embodiment. In this embodiment, an operator 100 measures illuminance at a predetermined measurement planned position by using a measuring unit 200. FIG. 1 conceptually shows an example of a case in which the operator 100 moves while carrying the measuring unit 200 and a terminal 300 for measuring at three points.

Structure of Hardware (1) Measuring Unit

The measuring unit 200 includes a rod-like support pole 201, a reflective prism 202 that is fixed on a top of the support pole 201, and an illuminometer 203 that is fixed on the reflective prism 202. The support pole 201 is extendable, and the operator can adjust the heights of the reflective prism 202 and the illuminometer 203 to desired positions. The support pole 201 can be extended and retracted by a structure that is manually operated by the operator. Alternatively, the extending and the retracting of the support pole 201 may be performed by each type of actuator or an electric motor.

The reflective prism 202 reflects measurement laser light to a position measuring device 400. The measurement laser light is emitted from the position measuring device 400. The illuminometer 203 is an example of an electromagnetic wave measuring device and measures illuminance of light of lighting equipment. The illuminometer 203 is connected to the terminal 300, which is carried by the operator, and the illuminometer 203 operates by control via the terminal 300. Illuminance data measured by the illuminometer 203 is stored in the terminal 300. The illuminometer 203 has directivity in a specific direction in a horizontal plane. The measuring direction of the illuminometer 203 is adjusted by rotating the support pole 201 around its axis. In some cases, the terminal 300 may be mounted on the support pole 201 so that the terminal 300 will move together with the measuring unit 200.

(2) Position Measuring Device

The position measuring device 400 emits measurement laser light to the surroundings while scanning. The measurement laser light hitting the reflective prism 202 is reflected thereat, and the reflected light is received by the position measuring device 400. The position measuring device 400 calculates a direction and a distance from the position measuring device 400 to the reflective prism 202 based on the emitting direction and propagation time of the measurement laser light. Thus, a relative positional relationship of the reflective prism 202 with respect to the position measuring device 400 is determined. The position of the position measuring device 400 is determined in advance so that information of the position of the reflective prism 202 will be obtained. In this embodiment, the position of the position measuring device 400 is determined in advance in a measurement field, that is, a measurement target place, in which illuminance is to be measured. For example, one or multiple reference points of which positions are precisely determined are provided in the measurement field, and the position measuring device 400 is arranged at the reference point. Thus, the position of the position measuring device 400 in the measurement field is preliminarily known. Alternatively, the position of the position measuring device 400 may be preliminarily measured by using a high precision GNSS device or the like.

Figure 2:
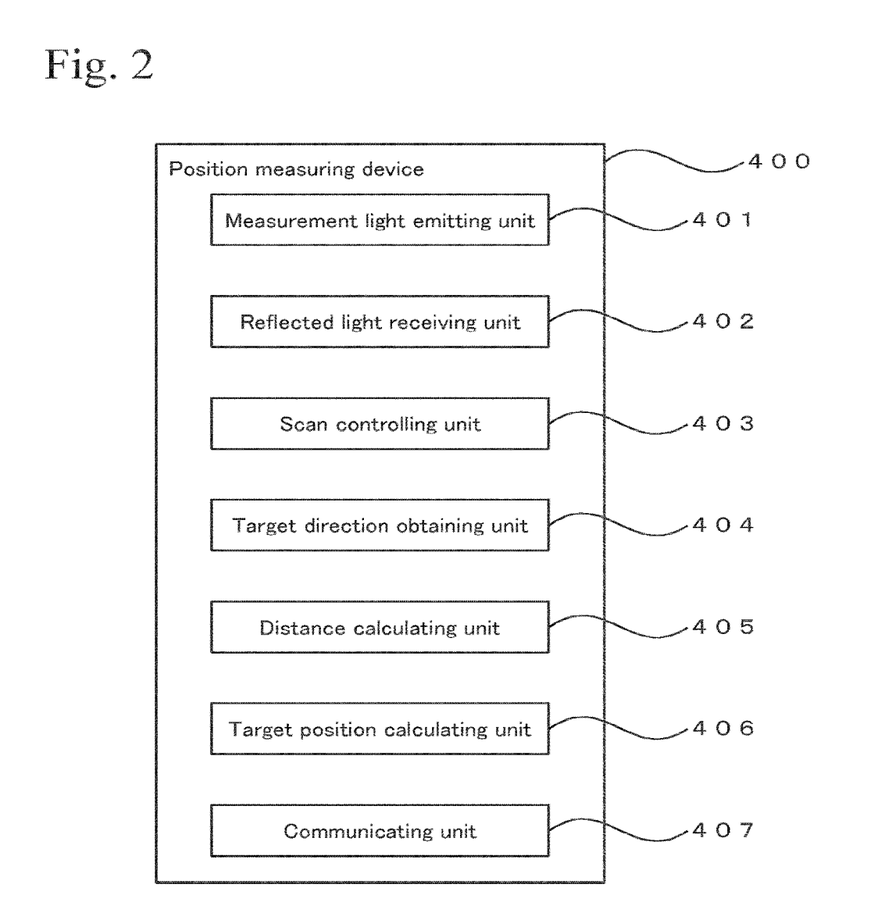
FIG. 2 is a block diagram of a position measuring device of an embodiment.

FIG. 2 shows a block diagram of the position measuring device 400. The position measuring device 400 includes a measurement light emitting unit 401, a reflected light receiving unit 402, a scan controlling unit 403, a target direction obtaining unit 404, a distance calculating unit 405, a target position calculating unit 406, and a communicating unit 407. The measurement light emitting unit 401 emits distance measurement laser light to the surroundings while scanning. The reflected light receiving unit 402 receives measurement light that has hit a target and that is reflected thereat. The target is the reflective prism 202 shown in FIG. 1. The measurement light emitting unit 401 and the reflected light receiving unit 402 are mounted on a rotatable table, whereby both emission of the measurement light and reception of the reflected light can be performed while the surroundings are scanned.

The scan controlling unit 403 controls the scanning using the measurement light. For example, the scan controlling unit 403 controls scan timing, scan direction, and emission timing of the measurement laser light. The target direction obtaining unit 404 obtains a direction of the target (in this case, the reflective prism 202) as viewed from the position measuring device 400, based on the emitting direction of the measurement light or the incident direction of the reflected light. In this embodiment, the target direction obtaining unit 404 obtains data of a horizontal angle and a vertical angle (elevation angle or depression angle). The distance calculating unit 405 calculates a distance from the position measuring device 400 to the target based on a flight time (propagation time) and the speed of the measurement light.

The target position calculating unit 406 calculates the position of the target with respect to the position measuring device 400 based on the direction of the target as viewed from the position measuring device 400 and based on the distance between the position measuring device 400 and the target. Here, in a condition in which the position of the position measuring device 400 in the measurement field is already known, the position of the target (reflective prism 202 in FIG. 1) in the measurement field is determined.

For example, it is assumed that a position $P_0(x', y', z')$ of the position measuring device 400 in the measurement field is known and that data of this known position is input in the position measuring device 400. In this case, a three-dimensional coordinate system having an origin at the position of the position measuring device 400 is used. Then, a measured position of the reflective prism 202 in the three-dimensional coordinate system is represented by $P_1(x, y, z)$, and a position (coordinates) P of the reflective prism 202 in the measurement field is calculated from the formula; $P=P_0+P_1$. This calculation is also performed by the target position calculating unit 406. Alternatively, the value of $P_0$ may be preliminarily input in the terminal 300, and the calculation for obtaining the position P may be performed by the terminal 300.

In a case in which the absolute position of the position measuring device 400 is known, the absolute position of the target is calculated. In this embodiment, the reflective prism 202 and the illuminometer 203 are arranged close to each other, and thus, the position of the reflective prism 202 is treated as the position of the illuminometer 203.

The communicating unit 407 wirelessly communicates with the terminal 300. Any wireless communication standard can be used. For example, a communication standard such as Wi-Fi, Bluetooth (registered trademark), various types of wireless LANs, mobile phone networks, or the like, may be used. The communicating unit 407 transmits data of the position of the target (the reflective prism 202 in FIG. 1) to the terminal 300. The data of the position of the target is calculated by the target position calculating unit 406. The data of preliminarily calculated or predetermined position of the position measuring device 400 is input in the position measuring device 400 via the communicating unit 407.

The technique relating to the position measuring device 400 is disclosed in Japanese Unexamined Patent Applications Laid-Open Nos. 2015-040831 and 2010-237169, for example.

(3) Terminal

As shown in FIG. 1, the operator 100 carries the terminal 300. The terminal is a commercially available tablet that can be used as a mobile general purpose computer, and the terminal includes a CPU, a memory, and various types of interfaces. A dedicated terminal may be prepared and be used for the terminal 300 instead of using a general purpose computer. The operator 100 performs work relating to illuminance measurement by using the terminal 300.

Figure 3:
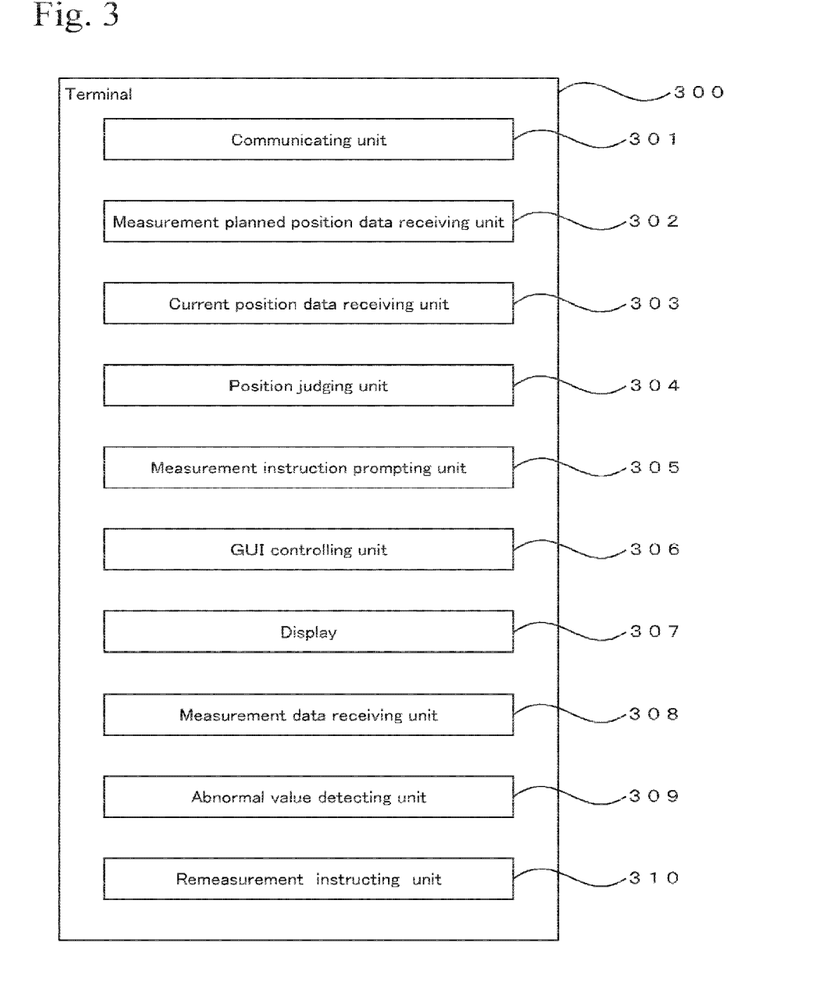
FIG. 3 is a block diagram of a terminal of an embodiment.

The terminal 300 includes a communicating unit 301, a measurement planned position data receiving unit 302, a current position data receiving unit 303, a position judging unit 304, a measurement instruction prompting unit 305, a GUI controlling unit 306, a display 307, a measurement data receiving unit 308, an abnormal value detecting unit 309, and a remeasurement instructing unit 310. In this embodiment, the communicating unit 301 and the display 307 are constructed of hardware that is equipped with the tablet, and the other functional units are constructed of software and are operated such that the CPU executes specific programs.

At least one of the functional units shown in FIG. 3 may be composed of a dedicated circuit. For example, each of the functional units shown in FIG. 3 may be composed of electronic circuits such as a CPU (Central Processing Unit), an ASIC (Application Specific Integrated Circuit), and a PLD (Programmable Logic Device) such as an FPGA (Field Programmable Gate Array).

Whether each of the functional units is to be constructed of dedicated hardware or is to be constructed of software so that programs are executed by a CPU, is selected in consideration of necessary operating speed, production cost, amount of electric power consumption, and the like. For example, a specific functional unit composed of an FPGA provides a superior operating speed but is high in production cost. On the other hand, a specific functional unit that is configured so that programs are executed by a CPU, can be made by using general purpose hardware and is thereby low in production cost. However, a functional unit constructed by using a CPU provides an operating speed that is inferior to the operating speed of dedicated hardware. Moreover, such a functional unit may not be able to perform complicated operations. Constructing the functional unit by dedicated hardware and constructing the functional unit by software differ from each other as described above, but are equivalent to each other from the viewpoint of obtaining a specific function. Alternatively, multiple functional units may be composed of one circuit.

The communicating unit 301 communicates with the position measuring device 400 (refer to FIGS. 1 and 2) and other devices. Each type of publicly known standards may be used as the communication standard. The measurement planned position data receiving unit 302 receives data of measurement planned positions, which are candidate positions at each of which illuminance is to be measured. The measurement planned positions at each of which illuminance is to be measured are determined in advance and are input in the terminal 300 via the communicating unit 301. Naturally, data of the measurement planned positions may be input in the terminal 300 via a publicly known storage medium, such as a USB memory or the like. The input data of the measurement planned positions is stored in a storage means (not shown) of the terminal 300, such as a semiconductor memory or the like.

The current position data receiving unit 303 receives data of a current position of the reflective prism 202, which is measured by the position measuring device 400. The data of the current position is received by the communicating unit 301 and is transmitted to the current position data receiving unit 303.

The position judging unit 304 compares the current position of the reflective prism 202, which is received by the current position data receiving unit 303, and the measurement planned position, which is determined in advance and is received by the measurement planned position data receiving unit 302. Then, the position judging unit 304 judges whether the difference between the current position and the measurement planned position is not greater than a predetermined range. After the position judging unit 304 judges this difference as being in the predetermined range, the measurement instruction prompting unit 305 performs processing for notification to prompt the operator to measure illuminance.

The GUI controlling unit 306 controls a GUI (Graphical User Interface), which is described later. The GUI is controlled by using a function that is equipped with an ordinary tablet. The GUI controlling unit 306 controls a UI (User Interface) display, which is described later. The display 307 is a liquid crystal display unit that is equipped in the terminal 300. The display 307 includes a touch panel sensor so that various kinds of controls may be performed by using the screen. This function utilizes the function of a commercially available tablet.

The measurement data receiving unit 308 receives illuminance data that is measured by the illuminometer 203. The illuminance data measured by the illuminometer 203 is linked with position data of the reflective prism 202 (illuminometer 203), which is measured by the position measuring device 400, and measurement time data. Then, the illuminance data is stored in an appropriate storage region in the terminal 300, such as a semiconductor memory or the like.

The abnormal value detecting unit 309 detects an abnormal value among measured values. The method for detecting an abnormal value is described later. The remeasurement instructing unit 310 performs processing for instructing the position measuring device 400 to measure the position of the reflective prism 202 when an abnormal value is detected and is then selected. The remeasurement may be instructed by the operator 100 or may be automatically instructed when a specific condition is satisfied.

Moreover, the terminal 300 has an internal or external attitude sensor and obtains its attitude in a measuring condition after being calibrated. Details of the calibration are described later.

Outline of Operation

The position measuring device 400 measures the position of a target, that is, the position of the reflective prism 202 shown in FIG. 1, and transmits this information to the terminal 300 through wireless communication. Then, the terminal 300 compares a predetermined measurement planned position and the current position of the reflective prism 202, which is measured by the position measuring device 400, and calculates a positional relationship therebetween. This positional relationship between the measurement planned position and the measured current position of the reflective prism 202 is graphically displayed on the display 307 of the terminal 300 (refer to FIGS. 4A to 4D).

Figure 4A:
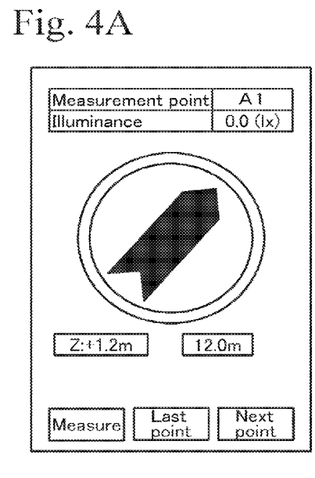
FIGS. 4A to 4D show examples of UI display screens.

After looking at a UI screen displayed on the display 307 of the terminal 300 as shown in FIG. 4A, the operator carrying the measuring unit 200 approaches the measurement planned position. Thereafter, when a specific condition is satisfied, the operator is prompted to measure illuminance by notification. The operator measures illuminance at the position, at which the operator has received the notification, by using the illuminometer 203 (refer to FIG. 1). These operations are performed for each of the measurement planned positions, whereby illuminance is measured at each of the measurement planned positions.

Examples of GUI Display Screens

FIGS. 4A to 4D show examples of GUI screens (UI screens) displayed on the display 307 of the terminal 300 (refer to FIG. 3). The GUI is controlled by using the screens as shown in FIGS. 4A to 4D and is performed by the GUI controlling unit 306. FIG. 4A shows a direction of the measurement planned position, a distance in a horizontal direction and a distance in a vertical direction to the measurement planned position, based on the position of the reflective prism 202 at that time. FIG. 4A shows a situation in which the measurement planned position exists at a position that is 12 meters in the horizontal oblique right front direction by 45 degrees and 1.2 meters in the upward vertical direction apart from the reflective prism 202 at that time. Although details are described later, the terminal 300 has an attitude sensor, and displaying is controlled so that the direction of the display screen shown in each of FIGS. 4A to 4D corresponds to the surrounding conditions. That is, displaying of an arrow is controlled so that a displayed arrow will point to the measurement planned position at any time regardless of the direction of the terminal 300.

Figure 4B:
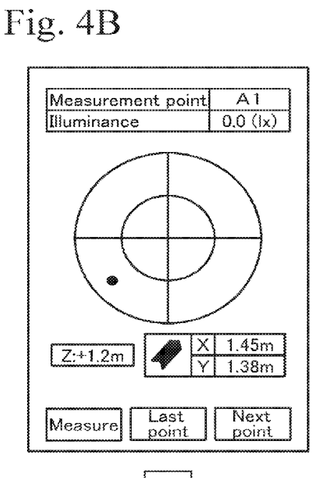

FIG. 4B shows a situation in which the reflective prism 202 comes to a position that is 1.45 meters in an X direction (right direction), 1.38 meters in a Y direction (front direction), and 1.2 meters in the upward vertical direction to the measurement planned position. In this case, by moving the reflective prism 202 1.45 meters in the X direction (right direction) and 1.38 meters in the Y direction (front direction) in addition to 1.2 meters in the upward vertical direction, the reflective prism 202 reaches the measurement planned position. The position of the reflective prism 202 and the position of the illuminometer 203 are close to each other and are thereby treated as being the same three-dimensional position. Accordingly, by moving the reflective prism 202 to the measurement planned position, the illuminometer 203 comes to be able to effectively measure illuminance at the measurement planned position.

Figure 4C:
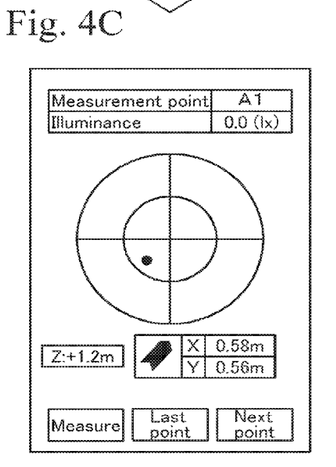
Figure 4D:
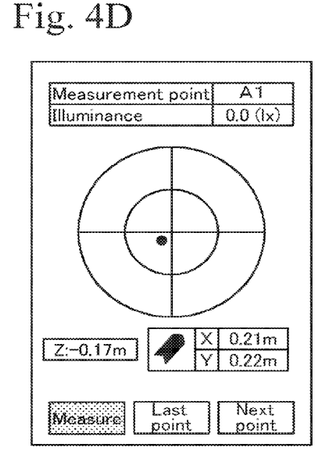

FIG. 4C shows a situation in which the reflective prism 202 comes to a position that is 0.58 meters in the X direction (right direction), 0.56 meters in the Y direction (front direction), and 1.2 meters in the upward vertical direction to the measurement planned position. FIG. 4D shows a situation in which the reflective prism 202 comes to a position that is 0.21 meters in the X direction (right direction), 0.22 meters in the Y direction (front direction), and 0.17 meters in the downward vertical direction to the measurement planned position. The display of "−0.17 in" represents that the measurement planned position is lower than the reflective prism 202 by 0.17 meters. In this case, by lowering the reflective prism 202 by 0.17 meters, the reflective prism 202 reaches the same height as the measurement planned position.

In these cases, the illuminance measurement is allowed to be performed at a position within a radius of 70 centimeters from the measurement planned position. Thus, when the horizontal distance between the current position of the reflective prism 202 and the measurement planned position is decreased to approximately 70 centimeters, a concentric circle indicating a radius of 70 centimeters is displayed so that approaching the measurement planned position will be recognized on the screen. This condition is shown in each of FIGS. 4B to 4D.

FIG. 4C shows a situation in which the reflective prism 202 comes to a position that is 70 centimeters or less in the horizontal plane from the measurement planned position, but in which the reflective prism 202 still needs to move 1.2 meters in the upward vertical direction to the measurement planned position. FIG. 4D shows a situation in which both the distance in the horizontal direction and the distance in the vertical direction of the reflective prism 202 are decreased to 70 centimeters or less. In this case, when the distance between the measurement planned position and the current position of the reflective prism 202 is decreased to 70 centimeters or less, the color or the gradation of the color at a part of the screen is changed, or highlighting such as blinking is performed, to notify the operator of being in close proximity to the measurement planned position. This notification may be given by a sound or the like. FIG. 4D shows an example in which an icon for instructing measurement is highlighted. In this case, the illuminance measurement is performed by the illuminometer 203 after the operator touches the screen at the position corresponding to the highlighted part.

Example of Processing

Figure 5:
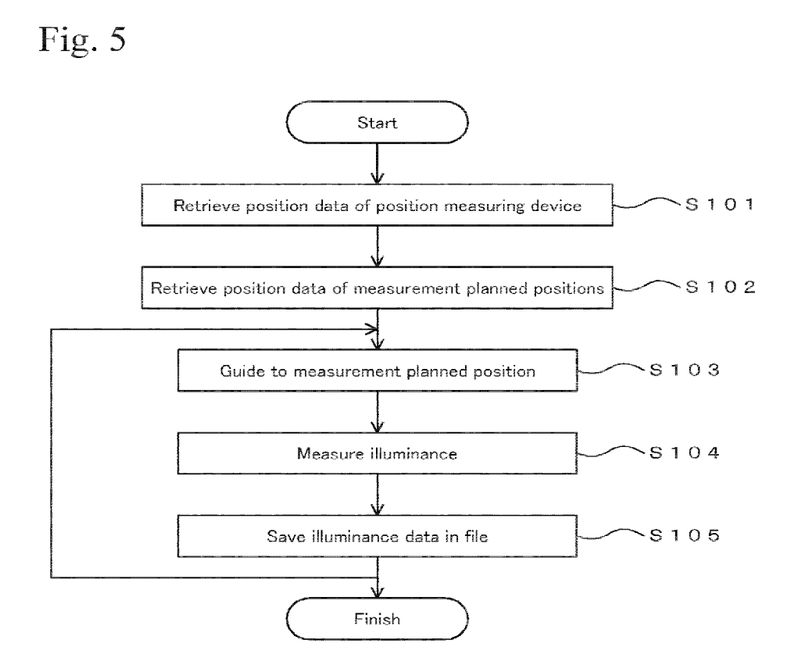
FIG. 5 is a flow chart showing an example of a processing procedure.

FIG. 5 shows a flow chart of an example of a processing procedure. Programs for executing the processing shown in FIG. 5 are stored in a memory of the terminal 300. Alternatively, the programs may be stored in an appropriate storage medium and may be provided therefrom. This is the same as in the case of processing for detecting an abnormal value, which is described later.

Figure 6A:
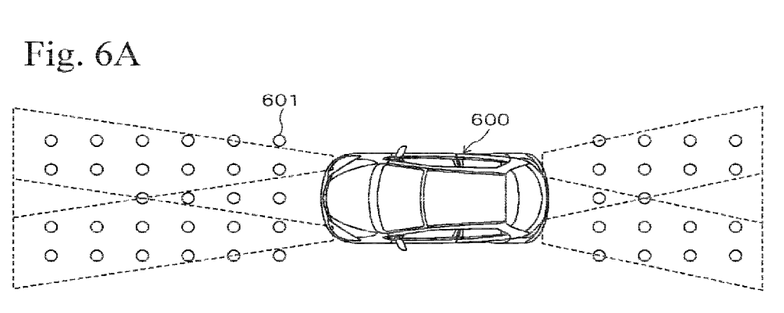
FIGS. 6A and 6B show an example of a situation for measuring illuminance.
Figure 6B:
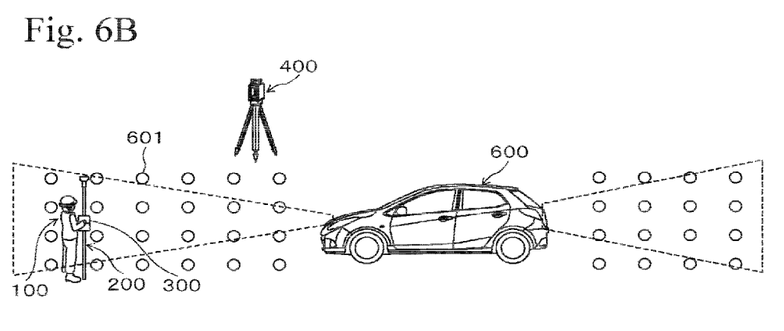

Here, an example of measuring illuminance of lights (headlights and taillights) of a vehicle 600 will be described. FIGS. 6A and 6B show a condition in which multiple measurement planned positions 601 are set in a grid in a three-dimensional space at a front side and a rear side of the vehicle 600. Although a passenger car is exemplified as a vehicle, a truck, a bus, or a special vehicle such as a crane vehicle or the like, may be used.

Relative positional relationships of the measurement planned positions 601 shown in FIGS. 6A and 6B with respect to the vehicle 600, and grid spaces between the measurement planned positions, are determined in advance. For example, the measurement planned positions are determined when the vehicle is designed, and a lower limit and a range of a measured value of illuminance at each of the measurement planned positions are also determined in advance. Here, illuminance measurement is exemplified. However, a standard of chromaticity of light of lighting equipment may be specified, and for example, a range of the chromaticity at each of the measurement planned positions may be determined in advance. The measurement field where the measurement is performed, as shown in FIGS. 6A and 6B, may be set outdoor or indoor.

Figure 7:
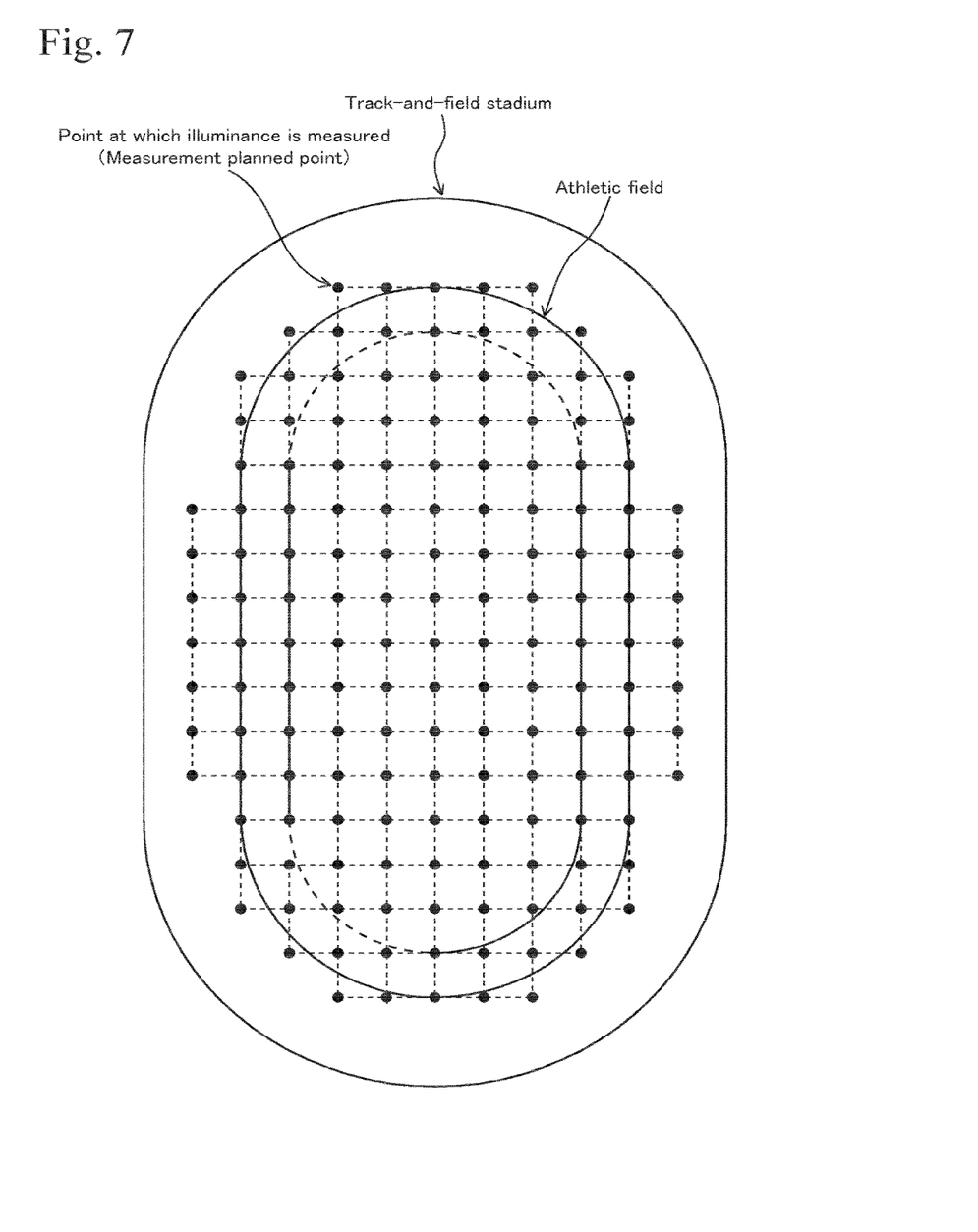
FIG. 7 shows an example of positions at each of which illuminance is measured.

FIG. 7 shows an example of a track-and-field stadium. In this case, multiple measurement planned positions are set in a grid in a two-dimensional plane of the track-and-field stadium. Alternatively, in this case, measurement planned positions may be set in a three-dimensional space as shown in FIGS. 6A and 6B.

First, the position measuring device 400 is arranged at a known position before the measurement is performed. Then, the terminal 300 is calibrated so that the terminal 300 is prepared to measure a direction. The calibration processing is performed as described below. First, map information of the measurement field where the measurement is performed, as shown in FIGS. 6A and 6B or FIG. 7, is input in the terminal 300. Then, a position of the terminal 300 is measured at each of multiple positions in the measurement field by using the position measuring device 400. In this operation, the terminal 300 is made close to the reflective prism 202, and then the position of the terminal 300 is measured. The attitude of the terminal 300 at each of the multiple positions is known by the attitude sensor equipped in the terminal 300. Thus, a relationship between the map information of the measurement field and the attitude of the terminal 300 is obtained. Consequently, the information as shown in FIGS. 4A to 4D is displayed on the display 307 of the terminal 300 while the direction of the screen image corresponds to the measurement field condition at any time. That is, the screen is displayed as shown in each of FIGS. 4A to 4D so that the direction of the measurement planned position is visually understood at any time even when the direction of the terminal 300 is changed.

Hereinafter, an example of an operation procedure is described with reference to FIG. 5. Here, an example of performing the measurement in the condition shown in FIGS. 6A and 6B is described. First, position data of the position measuring device 400 is input in the terminal 300 (step S101). The arranged position of the position measuring device 400 in the measurement field is already known, as described above, and data of the arranged position is input in the terminal 300. Then, data of predetermined measurement planned positions as exemplified in FIGS. 6A and 6B, is input in the terminal 300 (step S102).

After the processing in steps S101 and S102 is performed, processing for guiding the operator 100 to a measurement planned position by the terminal 300 is performed (step S103). The following processing is performed in step S103. First, after a program relating to the processing that is exemplified in FIGS. 4A to 4D is started in the terminal 300, a measurement planned position 601 that should be reached first is selected from the grid points shown in FIGS. 6A and 6B. Then, a UI screen for guiding to the selected position is displayed on the display 307 of the terminal 300 as shown in FIG. 4A. The operator 100 looks at the UI screen display, as shown in FIG. 4A, and carries the illuminometer 203 to the selected measurement planned position 601, which is set in a grid. This operation is performed such that the operator walks while looking at the terminal 300 and carrying the measuring unit 200 by hand.

For example, when the screen as shown in FIG. 4A is displayed first, the operator understands the direction and the distance to the displayed measurement planned position and then walks to the displayed measurement planned position. When the measurement planned position approaches, the display screen is changed to a display screen as shown in FIG. 4B, by which a relative positional relationship between the current position and the measurement planned position is easy to visually understand. Then, the operator 100 comes closer to the measurement planned position from the condition shown in FIG. 4B, and the position of the reflective prism 202 in the horizontal plane enters an area that can be regarded as the measurement planned position. In this case, the area is an area of radius of 70 centimeters. This condition is shown in FIG. 4C.

Thereafter, the operator 100 comes closer to the selected measurement planned position in the horizontal plane from the condition shown in FIG. 4C and adjusts the height of the reflective prism 202 by correcting the length of the support pole 201. This condition is shown in FIG. 4D. FIG. 4D shows the condition in which the three-dimensional position of the reflective prism 202 enters the area of radius of 70 centimeters from the measurement planned position and in which highlighting is performed for notifying the operator of being in the area. In this embodiment, a blinking icon for instructing the illuminance measurement is displayed in the screen, thereby notifying the operator 100 of the condition, in which the reflective prism 202 (illuminometer 203) reaches the measurement planned position and the illuminance measurement can be effectively performed.

At this stage, when the operator 100 controls the terminal 300 and instructs the illuminance measurement, the illuminometer 203 measures illuminance (step S104). The data of the measured illuminance is transmitted to the measurement data receiving unit 308 and is stored in a storage file that is set in the memory of the terminal 300. In this case, the illuminance data is stored by being linked with coordinate data of the measured position and measurement time data (step S105). The illuminance is measured in both the vertical direction and the horizontal direction (on a road surface). Alternatively, the illuminance may be measured in one of the vertical direction and the horizontal direction.

The above processing is performed at each of the measurement planned positions 601, which are set in a grid, in turn, whereby illuminance data at each of the measurement planned positions is obtained.

Detection of Abnormal Value (1) First Example

For example, in the cases shown in FIGS. 6A, 6B, and 7, necessary illuminance is specified in advance, and thus, a range of the normal value is determined in advance. For example, for a track-and-field stadium, a standard is specified in advance such that not less than a predetermined lux value must be measured at every point. The judgment is performed by using this necessary value to detect an abnormal value. In this case, a measured value outside the range of the necessary value is judged as being an abnormal value.

(2) Second Example

In this example, a measured value is judged as being an abnormal value when its deviation from an average value of a measurement data group is outside a predetermined range. For example, a measured value outside plus or minus 20% of an average value of measured values is judged as being an abnormal value. In this example, detection of an abnormal value is performed in postprocessing after the measurement is performed at all or most of the measurement planned positions.

Figure 8:
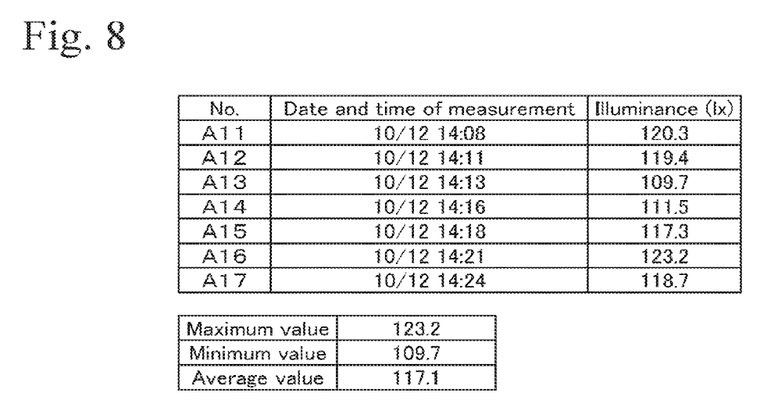
FIG. 8 shows examples of measurement data.

FIG. 8 shows examples of data of measured values. The data shown in FIG. 8 can be displayed on the display 307 of the terminal 300. FIG. 8 shows data that were obtained at seven measurement positions A11 to A17. The coordinate values at each of the positions A11 to A17 correspond to the predetermined measurement planned position. The guide to each of the positions A11 to A17 is performed by using the UI screens shown in FIGS. 4A to 4D described above. FIG. 8 shows a minimum value, an average value, and a maximum value among the measured values.

(3) Third Example

The method for detecting an abnormal value includes a method of comparing a measured value at a selected position and a measured value at a measurement position that is spatially adjacent to the selected position. For example, in the case shown in FIGS. 6A and 6B, there are 26 positions that are adjacent to a selected position at maximum. In the case shown in FIG. 7, there are 8 positions that are adjacent to a selected position at maximum.

For example, the case shown in FIGS. 6A and 6B is described. First, measured values of multiple measurement positions adjacent to a selected position are obtained. Then, a minimum value and a maximum value are removed from the obtained measured values, and an average value of the remaining measured values is calculated. Next, the degree of a deviation of the measured value at the selected position from the average value is judged. In this case, a threshold value range may be set, and whether the difference between the measured value at the selected position and the average value is within the threshold value range is judged.

A illuminance value of a specific point, which greatly differs from illuminance values of surrounding points, is likely to be an abnormal value. According to the above described judging method, whether a measured value of a selected position is relatively apart from measured values of adjacent measurement positions is quantitatively judged.

(4) Fourth Example

The measurement for obtaining data as shown in FIG. 8 may be repeated multiple times. In such a case, for example, if the measurement position A11 is selected, illuminance values are measured at the measurement position A11 at specific time intervals. This is the same as in the measurement of another measurement position. In this case, if there is a difference of not less than a threshold value between two measured values, which are measured at the same measurement position at a specific time interval, one of the two measured values is judged as being an abnormal value. The measured value can be judged as being an abnormal value among the two measured values by the other method disclosed in the specification of the present invention. In another case, the measurement is performed three or more times at the same position, and one measured value that is most different from the other measured values is detected as an abnormal value.

(5) Fifth Example

The judgment may be performed by using multiple methods for detecting an abnormal value, which are described above. Then, a measured value at a selected position may be judged as being likely to be an abnormal value by the multiple methods described above. In such a case, if the number of the methods exceeds a predetermined number, the measured value at the selected position is detected as an abnormal value.

An abnormal value is detected in postprocessing after the measurement is performed at all or most of the measurement planned positions in the above described First to Fourth Examples. Alternatively, an abnormal value may be detected during the measurement. In this case, processing for detecting an abnormal value is performed at each time of the measurement at the measurement planned position.

UI Screen

Hereinafter, UI displaying at the time when an abnormal value is detected is described. The following processing for displaying of the UI screen is performed by the GUI controlling unit 306. The result of the processing for detecting an abnormal value is displayed on the display 307. FIG. 8 shows an example of display contents. For example, if the measured value at the measurement position A13 in FIG. 8 is judged as being an abnormal value, displaying is performed as shown in FIG. 9.

Figure 9:
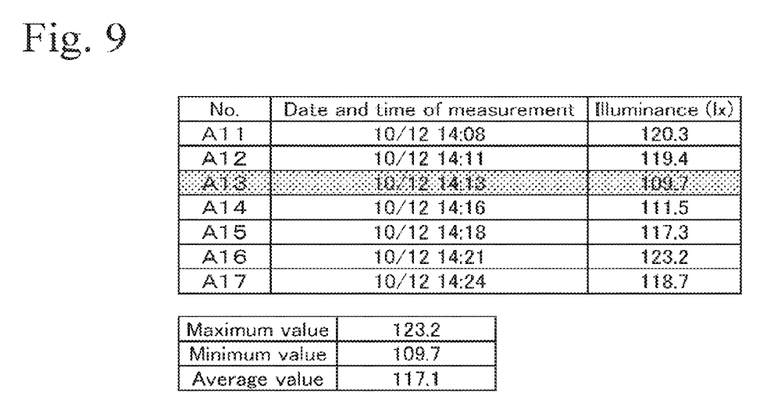
FIG. 9 shows examples of measurement data.

FIG. 9 shows a case in which the measured value at the measurement position A13 is judged as being an abnormal value. In this case, the data of the measurement position A13 is highlighted so that the operator will notice the measurement position A13. The processing in step S103 is executed with respect to the measurement position A13 when the portion of the screen corresponding to the measurement position A13 is selected in the condition shown in FIG. 9. Then, guiding to the measurement position A13 is performed by using the UT screens exemplified in FIGS. 4A to 4D. In this case, the position of the reflective prism 202 is measured by the position measuring device 400, and this data is received by the terminal 300. Then, a screen is displayed as shown in each of FIGS. 4A to 4D by setting a measurement planned position at the measurement position A13.

Figure 10:
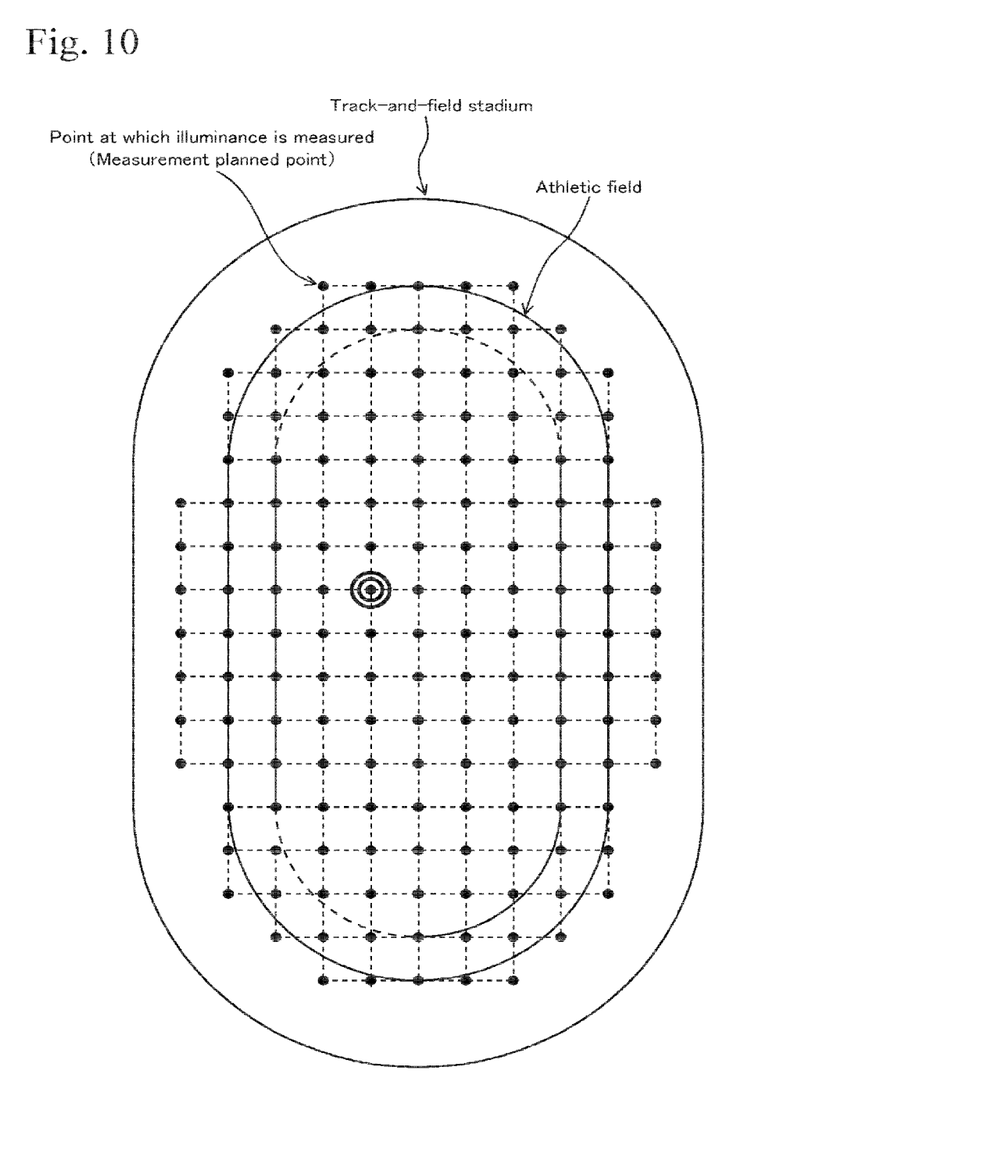
FIG. 10 shows an example of an image displayed on a display.

Moreover, a screen for visually recognizing the measurement position A13 in the measurement field may be displayed. A measured value may be judged as being an abnormal value at a specific measurement position in the example of the measurement field in FIG. 7. FIG. 10 shows an example in which this specific measurement position is highlighted with double circles. By displaying the content in FIG. 10 on the display 307, the operator can spatially understand the position at which the measured value is judged as being an abnormal value. The control for displaying the screen shown in FIG. 10 is performed by the GUI controlling unit 306.

When the operator selects the measurement position A13 in the screen shown in FIG. 9 or FIG. 10, processing for instructing the position measuring device 400 to remeasure the reflective prism 202 is performed. This processing is performed by the remeasurement instructing unit 310. In this case, a signal for instructing the remeasurement is transmitted from the communicating unit 301 to the communicating unit 407, and then the position of the reflective prism 202 is remeasured by the position measuring device 400.

Figure 11:
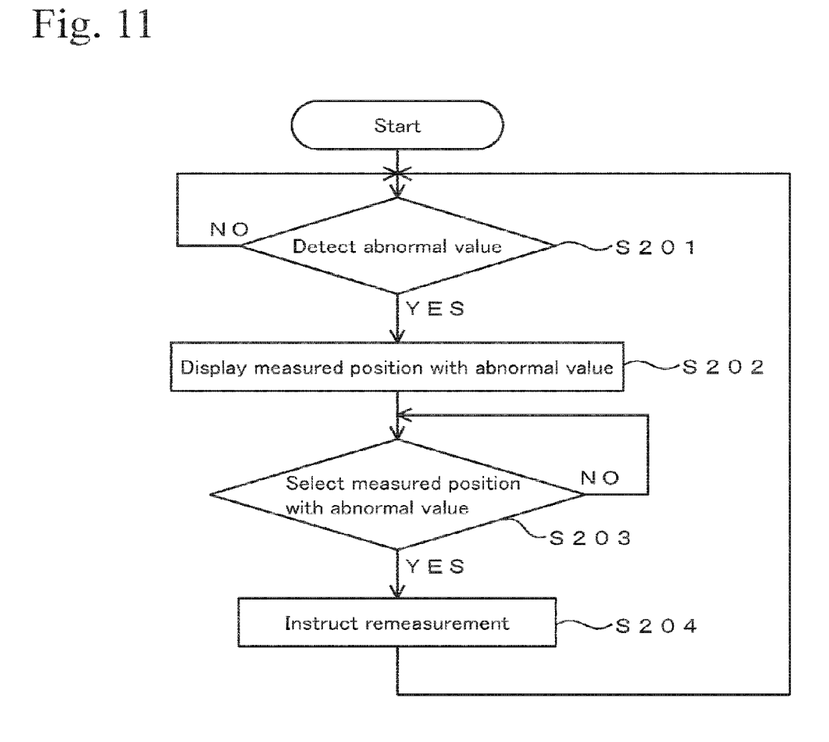
FIG. 11 shows an example of a processing procedure.

Hereinafter, an example of processing for detecting an abnormal value and performing subsequent remeasurement is described. FIG. 11 shows an example of a processing procedure. First, detection of an abnormal value is judged (step S201). If an abnormal value is detected, data relating a measurement position at which the abnormal value is measured is displayed (step S202).

Display showing data of the measurement position at which the abnormal value is measured is exemplified in FIG. 9 or FIG. 10. A reference symbol that is assigned for the coordinate position, such as "A13", is shown in FIG. 9 to display data of the measurement position at which the abnormal value is measured. A figure, by which the measurement position is visually understood, is shown in FIG. 10 to display data of the measurement position at which the abnormal value is measured.

Thereafter, whether the operator 100 selects the measurement position at which the abnormal value is measured is judged (step S203). If the operator 100 selects the measurement position, remeasurement is instructed to the position measuring device 400 (step S204). The selection is performed such that the operator 100 touches a touch panel display at the position corresponding to the measurement position using finger or a touch stylus. Naturally, the selection can also be performed by using a publicly known pointing device, such as a mouse or the like.

Thus, the operator 100 enters in a standby state for searching the measurement planned position by using the UI screens exemplified in FIGS. 4A to 4D, and illuminance can be measured at the position, at which the abnormal value is measured, again. According to the processing shown in FIG. 11, the measurement position at which an abnormal value is measured is efficiently remeasured.

Other Matters

Data such as of chromaticity, wavelength distribution characteristic, or the like, may be measured in addition to the illuminance. Moreover, the present invention can be used in a technique for measuring electromagnetic waves for communication, such as radio waves of a wireless LAN, radiation such as gamma rays, light in the invisible ultraviolet region or infrared region, electromagnetic waves generated by high-voltage transmission lines or high-voltage electric equipment, etc.

The field where the measurement is performed is not limited to specific places and can be selected from rooms for particular work, classrooms, lecture halls, event facilities, libraries, various types of public spaces, commercial facilities, rooms for public transportation, etc.

A part of the functional units of the terminal 300 shown in FIG. 3 may be performed by a separate external unit. In such a case, the present invention can be understood as a system.

What is claimed is:

1. An electromagnetic wave measuring device for measuring illuminance, comprising:
a measurement data receiver configured to receive data of measurement values of electromagnetic waves as the illuminance that are measured at multiple positions;
processing circuitry configured to examine a measurement value selected from among the data to detect an abnormal value in the data by comparing the selected measurement value with an average value of the measurement values, a measurement value measured at a position that is spatially adjacent to a position at which the selected measurement value is measured, and a measurement value measured at a time different from that for the selected measurement value, and to cause a display to display a position at which the abnormal value is measured.

2. The electromagnetic wave measuring device according to claim 1, wherein positions at which the electromagnetic waves are measured are measured by a position measuring device, and when the abnormal value is detected, the position at which the abnormal value is detected is displayed, and a signal that instructs remeasurement is output to the electromagnetic wave measuring device by selecting the displayed position.

3. The electromagnetic wave measuring device according to claim 2, wherein the processing circuitry is further configured to cause the display to display a relative positional relationship between a measurement planned position that corresponds to a location of a target measured by the position measuring device and that is a candidate at which the electromagnetic wave is measured in a measurement field and a position of the target that is measured by the position measuring device for guidance to the measurement planned position.

4. The electromagnetic wave measuring device according to claim 1, wherein the processing circuitry is further configured to perform processing for detecting the abnormal value in the measurement data every time the electromagnetic wave measurement is performed at one position or multiple positions.

5. The electromagnetic wave measuring device according to claim 4, wherein a position at which the electromagnetic wave is measured is measured by a position measuring device, and when the abnormal value is detected, the position at which the abnormal value is detected is displayed, and a signal that instructs remeasurement is output to an electromagnetic wave measuring device by selecting the displayed position.

6. The electromagnetic wave measuring device according to claim 5, wherein the processing circuitry is further configured to cause the display to display a relative positional relationship between a measurement planned position that corresponds to a location of a target measured by the position measuring device and that is a candidate at which the electromagnetic wave is measured in a measurement field, and a position of the target that is measured by the position measuring device, for guidance to the measurement planned position.

7. The electromagnetic wave measuring device according to claim 1, further comprising:
a light emitting unit that emits light
the measurement data receiving receiver is an illuminometer that measures the illuminance of the light.

8. An electromagnetic wave measuring method for measuring illuminance, comprising:
measuring electromagnetic waves as the illuminance at multiple positions;
receiving data of the measurement values of the electromagnetic waves;
examining a measurement value selected from among the data to detect an abnormal value in the data by comparing the selected measurement value with an average value of the measurement values, a measurement value measured at a position that is spatially adjacent to a position at which the selected measurement value is measured, and a measurement value measured at a time different from that for the selected measurement value; and
displaying, on a display, a position at which the abnormal value is measured.

9. A computer program product comprising a non-transitory computer-readable medium storing computer-executable program codes for electromagnetic wave measurement for measuring illuminance, the computer-executable program codes comprising program code instructions that when executed cause a computer to perform a method comprising:
measuring electromagnetic waves as the illuminance at multiple positions;
receiving data of the measurement values of the electromagnetic waves;
examining a measurement value selected from among the data to detect an abnormal value in the data by comparing the selected measurement value with an average value of the measurement values, a measurement value measured at a position that is spatially adjacent to a position at which the selected measurement value is measured, and a measurement value measured at a time different from that for the selected measurement value; and
displaying, on a display, a position at which the abnormal value is measured.

* * * * *